United States Patent
Sun

(10) Patent No.: US 9,434,629 B2
(45) Date of Patent: Sep. 6, 2016

(54) MEMBRANE MODULE AND MEMBRANE BIOREACTOR, WATER TREATMENT EQUIPMENT USING THE SAME

(75) Inventor: Youfeng Sun, Beijing (CN)

(73) Assignee: Beijing Ecojoy Water Technology Co., Ltd., Beijing (CN)

( * ) Notice: Subject to any disclaimer, the term of this patent is extended or adjusted under 35 U.S.C. 154(b) by 560 days.

(21) Appl. No.: 12/745,657

(22) PCT Filed: Dec. 12, 2008

(86) PCT No.: PCT/CN2008/073485
§ 371 (c)(1),
(2), (4) Date: Jun. 1, 2010

(87) PCT Pub. No.: WO2009/076911
PCT Pub. Date: Jun. 25, 2009

(65) Prior Publication Data
US 2010/0300947 A1 Dec. 2, 2010

(30) Foreign Application Priority Data

Dec. 14, 2007 (CN) .......................... 2007 1 0179610
Mar. 27, 2008 (CN) .......................... 2008 1 0102867
Apr. 2, 2008 (CN) .......................... 2008 1 0103311
Apr. 10, 2008 (CN) .......................... 2008 1 0103730

(51) Int. Cl.
| | |
|---|---|
| *B01D 63/02* | (2006.01) |
| *B01D 65/02* | (2006.01) |
| *C02F 3/12* | (2006.01) |
| *C02F 1/44* | (2006.01) |
| *B01D 63/04* | (2006.01) |

(52) U.S. Cl.
CPC ............. *C02F 3/1273* (2013.01); *B01D 63/02* (2013.01); *B01D 63/024* (2013.01); *B01D 65/02* (2013.01); *B01D 63/04* (2013.01); *B01D 2313/26* (2013.01); *B01D 2317/04* (2013.01); *B01D 2321/185* (2013.01); *Y02W 10/15* (2015.05)

(58) Field of Classification Search
CPC ...... B01D 63/02; B01D 65/02; B01D 65/08; B01D 69/08; B01D 2311/2661; B01D 2313/12; B01D 2313/105; B01D 2313/26; B01D 2321/18; B01D 2321/185
See application file for complete search history.

(56) References Cited

U.S. PATENT DOCUMENTS 3,775,307 A * 11/1973 McWhirter et al. .......... 210/629
4,179,380 A    12/1979 Amicel et al.
(Continued)

FOREIGN PATENT DOCUMENTS

| CN | 2531865 | 1/2003 |
|---|---|---|
| CN | 1440932 | 9/2003 |

(Continued)

*Primary Examiner* — Katherine Zalasky
(74) *Attorney, Agent, or Firm* — Boyle Fredrickson S.C.

(57) ABSTRACT

A hollow fiber membrane module includes a hollow fiber membrane bundle consisted of a plurality of hollow fiber membrane filaments, end part(s) at one end or both ends of the hollow fiber membrane bundle, an air inlet pipe and a produced water pipe. An air distributing device having air distributing holes is disposed at an end surface of at least one of the end parts. The air distributing device is communicated with the air inlet pipe. The air distributing holes are opened towards roots of the hollow fiber membrane filaments. Either one end of the hollow fiber membrane bundle (5) has the end part or both ends of the hollow fiber membrane bundle have the end parts.

19 Claims, 10 Drawing Sheets

(56) References Cited

U.S. PATENT DOCUMENTS

| | | | |
|---|---|---|---|
| 2004/0035780 A1* | 2/2004 | Mahendran et al. | 210/321.8 |
| 2009/0026140 A1* | 1/2009 | Wu et al. | 210/650 |
| 2009/0051057 A1* | 2/2009 | Kim et al. | 261/121.1 |

FOREIGN PATENT DOCUMENTS

| | | |
|---|---|---|
| CN | 2608491 | 3/2004 |
| CN | 1509800 | 7/2004 |
| CN | 1509801 | 7/2004 |
| CN | 2711152 | 7/2005 |
| CN | 1684755 | 10/2005 |
| CN | 2744398 | 12/2005 |
| CN | 2759581 | 2/2006 |
| CN | 1830531 | 9/2006 |
| CN | 1830837 | 9/2006 |
| CN | 1882381 | 12/2006 |
| CN | 2869001 | 2/2007 |
| CN | 1973969 | 6/2007 |
| CN | 101001689 | 7/2007 |
| CN | 101036858 | 9/2007 |
| CN | 101250003 | 8/2008 |
| CN | 101254410 | 9/2008 |
| CN | 101254977 | 9/2008 |
| CN | 101254978 | 9/2008 |
| JP | 64090005 | 4/1989 |
| JP | 07-185268 | 7/1995 |
| JP | H07185268 | 7/1995 |
| JP | 2000051670 | 2/2000 |
| JP | 2003-053157 | 2/2003 |
| JP | 2006247540 | 9/2006 |
| JP | 2007216175 | 8/2007 |
| JP | 2010090005 | 4/2010 |
| WO | 9706880 | 2/1997 |
| WO | 2005046849 | 5/2005 |
| WO | WO 2006/094436 * | 9/2006 |
| WO | 2007073080 | 6/2007 |

* cited by examiner

MEMBRANE MODULE AND MEMBRANE BIOREACTOR, WATER TREATMENT EQUIPMENT USING THE SAME

CROSS REFERENCE TO RELATED APPLICATIONS

This application claims priority to CN Patent Applications filed with State Intellectual Property Office of PRC: No. 200710179610.2 entitled "HOLLOW FIBER MEMBRANE MODULE" filed on Dec. 14, 2007; No. 200810102867.2 entitled "HOLLOW FIBER MEMBRANE MODULE" filed on Mar. 27, 2008; No. 200810103311.5 entitled "HOLLOW FIBER MEMBRANE MODULE" filed on Apr. 2, 2008; and No. 200810103730.9 entitled "HOLLOW FIBER CURTAIN TYPE MEMBRANE MODULE" filed on Apr. 10, 2008. These Patent Applications are hereby incorporated herein by reference in its entirety.

FIELD OF THE INVENTION

The present invention relates to a hollow fiber membrane module, a hollow fiber curtain type membrane module, and a membrane bioreactor, a water treatment equipment using the same.

BACKGROUND

Membrane bioreactor (MBR) technology is a highly efficient wastewater treatment and reclamation technology which represents an organic combination of a membrane separation technique and a conventional biological treatment technique. In a MBR system, various contaminants in wastewater are removed mainly by biological actions of microorganism. However, differing from the conventional biological treatment technology, membrane modules replace a secondary sedimentation tank and thoroughly separate sludge from water with highly efficient separation function, such that sludge retention time and hydraulic retention time may be independent from each other, which leads to increased concentration of active sludge in a biological reaction tank and accumulation of special bacteria in active sludge and thus enhances biological reaction rate. Separation of microorganism from water is no longer achieved through gravity sedimentation, instead, water molecules and some other small molecule substances permeate the membrane under pressure while microorganism and large molecule substances are intercepted in the biological reaction tank by the membrane. Therefore, excellent effluent quality is obtained by the system. The MBR technology substantially solves some prominent problems commonly existing in conventional wastewater treatment technology, for example, unstable effluent quality, large occupied area and complicated processing control, etc., and is a water treatment technology with great development potentiality. Especially in wastewater reclamation and reuse, domestic wastewater, municipal wastewater or similar industrial wastewater may be treated through MBR technology in one step into high quality reclaimed water to be used as municipal miscellaneous water, industrial circulating cooling water, etc. Therefore, MBR technology receives a widespread academic attention day by day all over the world, and large scale engineering application thereof is also increasing.

According to the position where the membrane module is disposed, membrane bioreactors may be divided into two major classes, i.e., separate, namely side stream, membrane bioreactor and integrated, namely submerged, membrane bioreactor. In general, a separate membrane bioreactor largely selects a columnar hollow fiber membrane module or a tubular membrane module, in which the membrane module and the bioreactor is disposed separately, mixed fluid in the bioreactor is delivered to the feed entrance of the membrane module after being pressurized by a circulating pump, liquid in the mixed fluid permeates the membrane under pressure and becomes treated effluent of the system, while solids, large molecule substances and the like are intercepted by the membrane and flow back into the bioreactor with concentrate. An integrated membrane bioreactor largely selects a curtain type or bundle type hollow fiber membrane module or a plate-frame type membrane module, in which the membrane module is submerged below the fluid level of the bioreactor. After raw water enters the membrane bioreactor, the majority of contaminants are decomposed or transformed by active sludge in the mixed fluid, and then water is filtered and discharged through the membrane under the negative pressure provided by a suction pump or under level difference. An aeration system is provided under the membrane module, and thus on one hand, provides microorganism with oxygen necessary for decomposing organic compounds, and on the other hand, based on gas stripping principle, enables the air-water two-phase flow to hydraulically flush the outer surface of the membrane, so as to restrain cake layer sediment on the membrane surface.

In table 2, part of the patents currently available domestically and abroad with respect to structural design on the hollow fiber membrane module are listed.

TABLE 2

| Part of the patents with respect to structural design on the hollow fiber membrane module | |
|---|---|
| CN patent No. or patent application No. | Applicant or Patentee |
| 02158708.6, 02158711.6 | Institute of Membrane Science and Technology, Tianjin Polytechnic University |
| 03822704.5 | Mitsubishi Rayon Co., Ltd., Japan |
| 200420029337.7 | Tianjin Haiyue Water Treatment Hi-Tech Co., Ltd. |
| 200420109650.1, 200510049324.5 | Zhejiang Omex Environmental Engineering Co., Ltd. |
| 2005800225651.5 | Koch Membrane Systems Inc., Germany |
| 200610065807.9 | Minliang Zhang |
| 200620039621.1 | Shanghai Dehong Biology Medicine Science & Tech Development Co., Ltd. |
| 200710056641.9 | Tianjin Motimo Membrane Technology Co., Ltd. |

These patents or patent applications have the following problems: the phenomenon that sludge accumulates at the roots of the hollow fiber membrane filaments is serious, and once sludge accumulation is formed, it is not easy to remove, which decreases effective filtration area and filtration uniformity of the hollow fiber membrane module. Continuous development and overspreading of membrane fouling at the roots of the hollow fiber membrane filaments in turn further increase uneven filtration and the loss of effective filtration area, and eventually shorten the life of the hollow fiber membrane module. Reference is made to FIG. 1, which is a schematic view of purging at a lower end part of a hollow fiber membrane module in the prior art. A short pipe 2 is previously embedded in the lower end part 1 of the hollow fiber membrane module, and gas is aerated through the short pipe 2 to enhance purging effect to the hollow fiber membrane filament 3. However, the orifice of this short pipe is opened upward, and the upper edge of the orifice is higher than the cast end surface of the lower end part 1 of the hollow fiber membrane module by a certain height, and aerated air flow thus generated, as shown in FIG. 1, is not able to purge and flush thoroughly the root of the hollow fiber membrane filament. Therefore, the problem that sludge accumulates at the roots of the hollow fiber membrane filaments is still not well solved.

SUMMARY OF THE INVENTION

An object of the present invention is to provide a hollow fiber membrane module, which can effectively avoid sludge accumulation at the roots of the hollow fiber membrane filaments.

Another object of the present invention is to provide a hollow fiber curtain type membrane module.

A further object of the present invention is to provide a membrane bioreactor and a water treatment equipment using the hollow fiber membrane module or the hollow fiber curtain type membrane module as described above.

To achieve the above objects of the invention, the following technical solution is adopted by the present invention:

A hollow fiber membrane module comprises a hollow fiber membrane bundle consisted of a plurality of hollow fiber membrane filaments, end part(s) at one end or both ends of the hollow fiber membrane bundle, an air inlet pipe and a produced water pipe, an air distributing device having air distributing holes is disposed at an end surface of at least one of the end parts, the air distributing device being communicated with the air inlet pipe, the air distributing holes being opened towards roots of the hollow fiber membrane filaments, wherein the phrase "end part(s) at one end or both ends of the hollow fiber membrane bundle" means that one end of the hollow fiber membrane bundle has the end part or both ends of the hollow fiber membrane bundle have the end parts.

The air distributing device not only allows for a more even aeration, but also sweeps the roots of the hollow fiber membrane filaments more thoroughly. The loading density of the hollow fiber membrane filament in the membrane module is high, and generally up to 300-1200 $m^2/m^3$. Under such a high loading density, sludge accumulating phenomenon easily occurs at the roots of the hollow fiber membrane filaments, and once sludge accumulation is formed, it is not easy to remove. The air distributing device provided by the present invention is disposed at the root of the hollow fiber membrane filament, and the air distributing holes thereon are opened towards the root instead of straightly upward. Therefore, air flow from the air distributing holes will not rise straightly, but sweep the roots of the hollow fiber membrane filaments firstly, which improves substantially the turbulence of the water flow at the root of the hollow fiber membrane filament, such that solids in liquid to be filtered is not easy to deposit and retain, and thus prevents sludge from accumulating at the roots of the hollow fiber membrane filaments. Herein, the hollow fiber membrane filament is also referred to as "membrane filament", and the hollow fiber membrane bundle is also referred to as "membrane bundle".

There are many choices for orientation of the opening of the air distributing hole. Preferably, the air distributing holes are opened towards a horizontal direction or towards a downwardly inclined direction. With respect to the root of the hollow fiber membrane bundle, when the air distributing hole is opened vertically upward, the air flow is directed parallel to surfaces of the hollow fiber membrane filaments and thus the resulting sweeping force is small. When the air distributing hole is opened towards a horizontal direction, air flow from the air distributing hole is directed perpendicular to surfaces of the hollow fiber membrane filaments, and thus the resulting sweeping force is greatly increased compared with the case when the opening faces upward, furthermore, a portion of the air flow will move downward and thus facilitate sweeping the roots of the membrane filaments. When the air distributing hole is opened towards a downwardly inclined direction, the outcoming air flow is directed sideways towards end surfaces close to the proximate end part, and the air flow will predominantly move downward and thus enhance the sweeping to the roots of the membrane filaments, furthermore, the air flow continues to rise after sweeping the roots of the membrane filaments, and the resulting air-water two-phase flow continues to provide cross flow on surfaces of other portions of the hollow fiber membrane filaments. Obviously, such sweeping effect is better than the sweep effect when the hole is opened vertically upward.

For the above described hollow fiber membrane module, the air distributing device may have at least three hollow spokes, and the air distributing holes are provided at side surfaces of the spokes. The arrangement of a plurality of spokes allows for a more even aeration, and thus the sweeping to the roots of the hollow fiber membrane filaments is more thorough, also, the rising air-water two-phase flow is more uniform. The spokes may be uniformly distributed in a star-like manner with the center of the end part as a center of circle. Preferably, three to eight radial or helically curved spokes are used to divide the end surface into three to eight portions with an equal area. Accordingly, the hollow fiber membrane bundle is uniformly divided into three to eight small bundles, each of which is cast in a space between the spokes.

The air distributing holes are provided at side walls of the spokes, and air flow from the air distributing hole is generally directed towards a horizontal direction. When the side walls have a certain thickness, the thickness of the side wall may be employed to design the opening of the air distributing hole during the manufacture, such that the air flow from the air distributing hole travels sideways downwardly or upwardly. Certainly, it is preferred in the present invention that the air flow travels sideways downwardly. The control of the direction of the air flow may be achieved in other ways.

There are various forms in the shape, the number, the size and the distribution of the air distributing holes. The air distributing holes may take a circular or elongated shape, and are distributed linearly along the spoke from the center of the end surface of the end part to the edge of the end surface of the end part. When an elongated shape is employed, the longer side of each hole should be substantially parallel to the end surface. The openings of the air distributing holes may have equal distance or unequal distance from the end surface of the hollow fiber membrane filament, which distance is in a range of 1 mm-20 mm, preferably 2 mm-10 mm. The diameter, or the length of the shorter side, of the air distributing holes is 1 mm-10 mm, preferably 1 mm-5 mm.

Preferably, the end surface of the at least one end part is a protruded end surface. More preferably, the protruded end surface is of a truncated cone shape.

The hollow fiber membrane filaments are typically cast in the end part of the hollow fiber membrane module with resin, but may also be made integrally with the end part in other ways. The present invention is described taking a form of cast end part for example, however, the connection or joint way between the end part and the hollow fiber membrane filaments is not limited to this. In the case that the end surface of the end part cast with the hollow fiber membrane filaments is a flat or concaved end surface, serious sludge accumulating phenomenon will occur on the cast end surface. The cast end surface of the end part is a protruded end surface, and the protruded direction is defined as a direction away form the cast end surface towards the middle of the hollow fiber membrane filaments. Such a protruded structure may form an inclination from the center to the surrounding area and thus facilitate purging contaminants, such as sludge, to the surrounding area by the air flow and reducing sludge accumulation.

The protrusion may have a shape of a cone, pyramid, spherical crown with their tip cut away, or any other known shape. Preferably, the protrusion is a cone or pyramid with its tip cut away, i.e. a truncated cone shape or a prismoid shape. A truncated cone-shaped or prismoid-shaped structure is easy to be manufactured and facilitates arranging other parts, such as a connecting pipe and the like, at the center thereof. When the protrusion is in a truncated cone shape, still more preferably, the projection point of the circle center of any cross section of the truncated cone that is parallel to the cross section of the bottom of the truncated cone on the cross section of the bottom of the truncated cone coincides with the circle center of the cross section of the bottom of the truncated cone. Herein, such a truncated cone shape is referred to as a regular truncated cone shape. When the protrusion is in a prismoid shape, still more preferably, any cross section of the protrusion that is parallel to the cross section of the bottom of the prismoid is a regular polygon with equal sides, and all side surfaces of the prismoid are completely same isosceles trapezoids. Herein, such a prismoid shape is referred to as a regular prismoid shape, and preferably is a regular prismoid shape with the cross section thereof being a square or regular hexagon.

When the protrusion is in a regular truncated cone shape or a regular prismoid shape, the diameter of the bottom circle or bottom surface circumcircle of the protrusion is in a range of 20 mm-300 mm, preferably 40 mm-150 mm, the diameter of the top circle or top surface circumcircle of the protrusion is in a range of 5 mm-150 mm, preferably 10 mm-50 mm, and the distance between the bottom surface and the top surface of the protrusion, i.e., the height of the protrusion, is in a range of 5 mm-200 mm, preferably 10 mm-100 mm. When the protrusion is in a regular truncated cone shape, the longitudinal section along a central axis of the truncated cone is a isosceles trapezoid, and the angle between the hypotenuse and the bottom side of the isosceles trapezoid may be 5°-80°, preferably 15°-75°, yet still more preferably 30°-60°. When the protrusion is in a regular prismoid shape, the angle between the side surface and the bottom surface of the prismoid may be 5°-80°, preferably 15°-75°, yet still more preferably 30°-60°. The angle size between plane surfaces is determined in the following manners: (1) if there is no intersection line between two plane surfaces, the angle therebetween is zero; (2) if there is an intersection line between two plane surfaces, an acute angle may be formed by projecting the two plane surfaces onto a third plane along the intersection line, then this acute angle is the angle between the two plane surfaces.

The air distributing device with air distributing holes is disposed at the bottom of the protrusion of the cast end surface of the end part, which allows for a more thorough sweeping to the roots of the hollow fiber membrane filaments. The loading density of the hollow fiber membrane filament in the membrane module is high, therefore, sludge accumulating phenomenon easily occurs at the roots of the membrane filaments. And once sludge accumulation is formed, it is not easy to remove. The air distributing device provided by the present invention is disposed at the root of the hollow fiber membrane filament, and the air distributing holes thereon are opened towards the top of the protrusion of the cast end surface. Therefore, air flow from the air distributing holes will not rise straightly, but diffuses sideways upwardly along the side wall of the protrusion and directly transversely sweeps the roots of the hollow fiber membrane filaments on the way, which substantially improves the turbulence of the water flow at the root of the hollow fiber membrane filament, such that solids in liquid to be filtered is not easy to deposit and retain. Furthermore, the protruded structure forms a gradient, so as to provide the accumulating sludge or contaminants that might retain on the protrusion with a gravitationally potential energy height and to make them uneasy to stay on the side surface of the protruded structure, thus preventing sludge from accumulating at the roots of the hollow fiber membrane filaments.

When the protrusion is in a regular truncated cone shape, it is a better selection that the air distributing holes are linearly and uniformly distributed along the circumference of the bottom circle of the truncated cone. The roots of the hollow fiber membrane filaments are all cast on an inclined surface of the side wall of the truncated cone, and the projections thereof on the bottom surface of the truncated cone are radially distributed in concentric circles on the center of the bottom circle, which allows for a more even aeration and also a better sweeping effect.

When the protrusion is in a regular prismoid shape with its cross section being a square or regular hexagon, the air distributing holes are linearly and uniformly distributed along four sides of the square or six sides of the hexagon of the bottom of the prismoid. The hollow fiber membrane filaments are evenly divided into four or six small bundles. The roots of each small bundle of membrane filaments are cast on the inclined surface of the side wall of the prismoid. The projections of the roots of all membrane filaments on the bottom surface of the prismoid are radially distributed in concentric regular polygons on the center of the circumcircle of the bottom surface. In this way, better aeration uniformity and sweeping effect can be achieved.

The air distributing holes are opened towards the top of the protrusion of the cast end surface. Thus, air flow from the air distributing holes will move parallel to the side wall of the protrusion and transversely sweep the roots of the membrane filaments.

When the hollow fiber membrane module has two end parts, each of the end parts may be provided with the air distributing device with air distributing holes at the end surface thereof, and the two air distributing devices are communicated with each other through a hollow hose. The functions of the hollow hose include: (1) supplying the two air distributing devices with air flow through the hollow hose, allowing the roots of the membrane filaments at both ends of the hollow fiber membrane bundle to be purged and swept directly by air flow, preventing sludge from accumulating at the roots of the membrane filaments; (2) connecting the upper and lower end parts, further, due to the fact that the hose has a length slightly less than that of the hollow fiber membrane filament, serving to receive gravity force and pulling force during swing of the lower end part, so as to protect the hollow fiber membrane filaments from tensile failure due to being under stress; (3) facilitating the maintenance and rinsing of the membrane module in that it is a flexible connection, thus the membrane module may easily be pulled out from a water treatment tank operating in line for rinsing or replacing without using a lifting equipment, and this can be operated by only one person and easy to perform.

In any of the above described hollow fiber membrane modules, a sleeve may be provided outside the hollow fiber membrane bundle. The sleeve functions to restrain the air-water two-phase flow formed by the aeration and to prevent it from diffusing outside the sleeve, and thus substantially reduces the gas stripping section, such that a high aeration intensity may be obtained in the hollow fiber membrane bundle with a relatively small aeration amount, which allows the air-water two-phase flow to have a better hydraulic sweeping effect to the outer surface of the membrane filament, and effectively restrains the development of membrane fouling and significantly saves the aeration energy consumption.

The cross section of the sleeve may be circular, rectangular, square shape or any other known shape. Preferably, the cross section of the sleeve is circular shape. Each cross section from top to bottom of the sleeve may have equal area or different area. Preferably, each cross section of the sleeve from top to bottom has equal area, or the cross sections at the middle portion are slightly smaller than the cross sections at upper and lower ends in area, for example, the sleeve may be designed in shape like a venturi tube or a venturi nozzle.

In the present invention, the upper end part refers to the end part close to a water surface and the lower end part refers to the end part close to a water bottom when the membrane module is in operation in the water treatment process. The upper end part and the lower end part correspond to the upper end opening and the lower end opening of the sleeve, respectively. When the hollow fiber membrane module only has one end part, it may be also determined according to this definition.

The sleeve, the air inlet pipe and the produced water pipe may be rigid or flexible. Preferably, they are flexible, and made from material, such as silicon rubber, fluorine rubber, soft polyvinyl chloride, polyurethane, etc.

A connecting pipe may be provided between the two end parts for connecting the both.

The upper end part and the lower end part are connected integrally by the connecting pipe. The length of the connecting pipe may be equal to or slightly less than that of the hollow fiber membrane bundle. Preferably, the length of the connecting pipe is slightly less than that of the hollow fiber membrane bundle. In this way, a long time loading on the membrane filaments caused by the swing of the end part in a large magnitude may be prevented and thus the membrane bundle is protected.

When the hollow fiber membrane module has two end parts, the air inlet pipe is disposed at one of the two end parts, the produced water pipe is disposed at the other end part, or the air inlet pipe and the produced water pipe are both disposed at one of the end parts. Preferably, the air inlet pipe is disposed at one of the two end parts and the produced water pipe is disposed at the other end part. Still more preferably, the produced water pipe is disposed at the upper end part and the air inlet pipe is disposed at the lower end part. The number of the air inlet pipe and the produced water pipe may be selected according to the actual engineering situation. That is, the selection may be one air inlet pipe and one produced water pipe, or two or more air inlet pipes, or two or more produced water pipes, or even two or more air inlet pipes and two or more produced water pipes simultaneously.

The upper end part and the lower end part may have the same or different shape. Preferably, the upper end part is slightly larger than the lower end part, which allows the lower end of the whole hollow fiber membrane bundle to have a certain swing magnitude within the sleeve.

Compared with the prior art, the present invention has the following advantageous effects.

(1) The anti-pollution performance of the hollow fiber membrane module, particularly of the root of the hollow fiber membrane bundle, is enhanced, and thus the life of the hollow fiber membrane module is elongated. Specifically, the air distributing holes of the air distributing device disposed at the end of the hollow fiber membrane bundle are opened towards the roots of the hollow fiber membrane filaments, which effectively avoids a common phenomenon existing in the prior art hollow fiber membrane module that the membrane filaments are too dense and sludge accumulates easily at the root due to pursuing for a high loading density, always maintains the effective filtration area and filtration uniformity of the hollow fiber membrane filaments during the water treatment process, and thus can effectively prevent the life of the whole bundle of membrane filaments from being shortened by the rapid development and spreading of the membrane fouling at the roots of the membrane filaments. In addition, since the hollow fiber membrane bundle is in a suspended state in liquid to be filtered and the arrangement of various soft connecting parts, i.e., the soft connecting pipe, air inlet pipe and produced water pipe, etc., allows the membrane bundle to swing with the two end parts within a certain range, wobbling angle of the roots of the membrane filaments with the cast end surface is significantly reduced, the pulling force between the roots of the membrane filaments and the cast end surface is also greatly reduced, and thus the breakage possibility of the roots of the membrane filaments is greatly reduced, the operating stability of the membrane module is improved, and the life of the membrane module is elongated.

(2) The convenience degree in manufacturing, assembling, installing and maintaining of the hollow fiber membrane module is improved. The interior structure of the end part cast with the hollow fiber membrane filaments of the membrane module according to the present invention is simple and the end part has no complex structural members therein, therefore, the difficulty and reject rate in the casting and sealing process are reduced, an assembly type structure is achieved in the overall membrane module, and the product is easy to be assembled quickly. Due to being fixed to a fixing device by way of a flexible connection, each membrane module may be mounted and dismounted individually, and the whole operation may be performed by a single person, unlike an existing hollow fiber membrane module where it has to be lifted and installed integrally through a lifting equipment after being built into a large membrane unit and thus the operation can be laborious and can not be operated by a single person. When the connecting pipe between the two end parts uses a flexible pipe, requirement for the height of the space above the membrane module when mounting and dismounting the membrane module is greatly lowered, which facilitates mounting and maintaining of the hollow fiber membrane module to a large extent, and provides the hollow fiber membrane module with excellent adaptability to various application circumstances.

The present invention also provides a membrane bioreactor using such hollow fiber membrane module.

The present invention further provides a water treatment equipment using such hollow fiber membrane module.

A hollow fiber curtain type membrane module is provided comprising a hollow fiber membrane bundle consisted of a plurality of hollow fiber membrane filaments, end part(s) at one end or both ends of the hollow fiber membrane bundle, an air inlet pipe and a produced water pipe, the end part is of elongated shape, an air distributing device having air distributing holes being provided on at least one of the end parts, the air distributing device being communicated with the air inlet pipe, the air distributing holes being opened towards roots of the hollow fiber membrane filaments, wherein the phrase "end part(s) at one end or both ends of the hollow fiber membrane bundle" means that one end of the hollow fiber membrane bundle has the end part or both ends of the hollow fiber membrane bundle have the end parts.

Preferably, the air distributing holes are opened towards a horizontal direction or towards a downwardly inclined direction.

Preferably, an end surface of the end part is a protruded end surface, when the hollow fiber curtain type membrane module is vertically placed, the air distributing holes are positioned close to a bottom of the protruded end surface and the air distributing holes are opened towards a top of the protruded end surface.

The design idea of the hollow fiber curtain type membrane module is consistent with that of the hollow fiber membrane module, therefore, substantially the same technical effect is achieved.

REFERENCE NUMBERS

1—lower end part, 2—short pipe, 3—hollow fiber membrane filament, 4—sleeve, 5—hollow fiber membrane bundle, 6—upper end part, 7—produced water collecting chamber, 8—produced water pipe, 9—air inlet pipe, 10—connecting pipe, 11—air distributing device with air distributing holes, 12—spoke, 13—air distributing hole, 14—water outlet branch pipe, 15—aerating branch pipe, 16—water collecting end part, 17—central pipe, 18—air distributing end part, 19—water outlet, 20—quick coupling.

DETAILED DESCRIPTION OF THE INVENTION

Description is provided below in conjunction with examples.

Example 1

Figure 2:
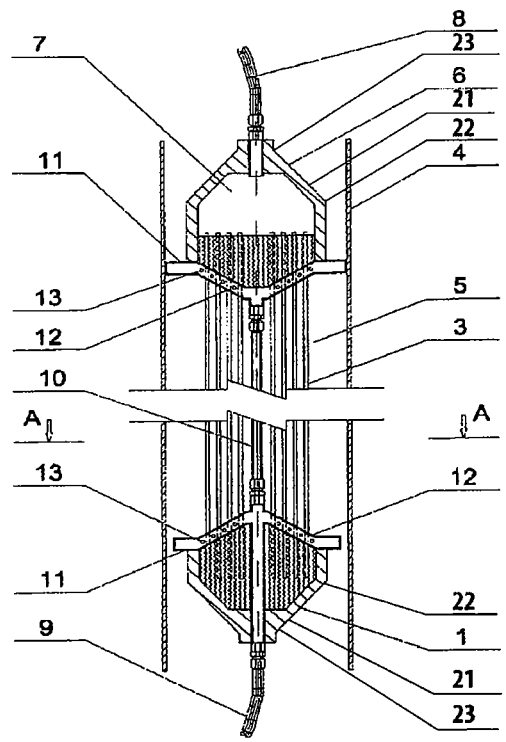
FIG. 2 is a longitudinal sectional view of the hollow fiber membrane module described in example 1 of the present invention.
Figure 3:
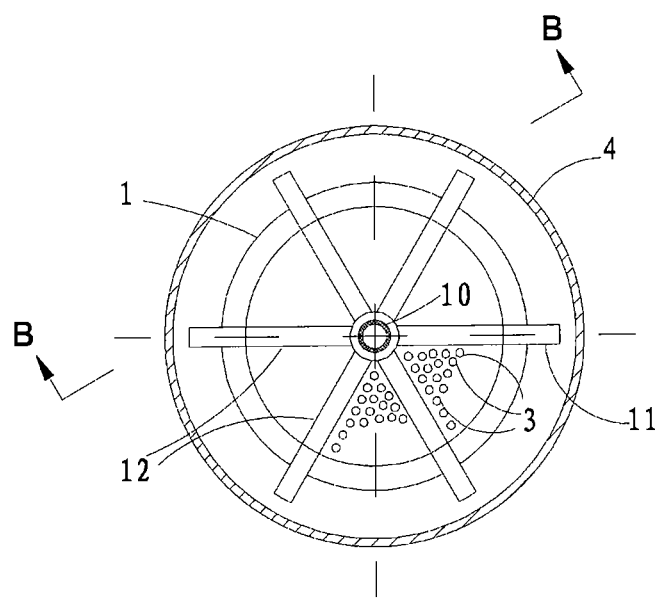
FIG. 3 is a sectional view taken at A-A in FIG. 2.

As shown in FIGS. 2 and 3, a hollow fiber membrane module includes a sleeve 4 having an inner diameter of 65 mm and a hollow fiber membrane bundle 5 which is disposed within the sleeve 4 and is consisted of two hundred and forty hollow fiber membrane filaments 3. The average aperture of micro-holes of the hollow fiber membrane filaments 3 for passing liquid therethrough is 0.01 μm. The hollow fiber membrane filament has an outer diameter of 1.2 mm, and is made of material of PVDF (polyvinylidene fluoride). The opposing ends of the hollow fiber membrane filaments are converged in an upper end part 6 and a lower end part 1 by being cast with epoxy resin and are secondarily cast with polyurethane, so as to protect the root of the membrane filament. Each of the upper end part 6 and the lower end part 1 is of a cup shape in its overall profile, with the diameter of the upper opening circle thereof being 45 mm. The hollow fiber membrane filament 3 is in an opened state in a produced water collecting chamber 7 within the upper end part 6 and is in a closed state within the lower end part 1. A produced water pipe 8 having an outer diameter of ϕ8 mm is disposed at the upper end part 6. An air inlet pipe 9 having an outer diameter of ϕ8 mm is disposed at the lower end part 1. The two end parts are connected integrally through a connecting pipe 10 having an outer diameter of ϕ6 mm. The hollow fiber membrane filaments 3 are uniformly distributed around the connecting pipe 10. The produced water pipe 8, the air inlet pipe 9 and the connecting pipe 10 are all hollow plastic hoses. The connecting pipe 10 passes through the lower end part 1 so as to be communicated with the air inlet pipe 9, and the produced water pipe 8 is communicated with the produced water collecting chamber 7 in the upper end part 6.

Both of the end parts are provided with an air distributing device 11 with air distributing holes at end surfaces thereof cast with the hollow fiber membrane filaments. The air distributing device 11 with air distributing holes has six radially distributed spokes 12, each of which is 5 mm in width and 4 mm in height. Angles between two adjacent spokes are all 60°. The spokes 12 extend from centers of the end part end surfaces to a circumference of the upper end part 6 or the lower end part 1, with a cavity inside the spokes. The opposing side walls of each spoke 12 are perpendicular to the cast end surface, and the other side facing away from the cast end surface is rounded. Four circular air distributing holes 13 having a diameter of ϕ2 mm are provided at central portions on the opposing side walls. The air distributing hole has a central axis perpendicular to the side wall surface of the spoke 12 and has a height of 2 mm from the cast end surface. The distances between the central axes of every two adjacent air distributing holes are all 4 mm. The cavity of the spoke 12 is communicated with the connecting pipe 10.

The cast end surface is divided into six portions having an equal area by the spokes 12. Accordingly, the hollow fiber membrane bundle 5 is uniformly divided into six small bundles, each of which is consisted of forty hollow fiber membrane filaments 3 and is cast in a space between the spokes 12. Each end surface cast with hollow fiber membrane filaments of the upper end part 6 and the lower end part 1 has a protrusion shaped in a flat top cone, i.e., a truncated cone 21. The two protrusions of the upper and lower end parts are well opposed to each other. The protrusion has a bottom circle 22 having a diameter of ϕ40 mm, a top circle 23 having a diameter of ϕ12 mm and a height of 10 mm. The air distributing device 11 with air distributing holes is just capped on and adhered with the protrusion, the portions where the both are in contact with each other are completely sealed.

The spoke 12 of the air distributing device 11 with air distributing holes is projected out of the circumference of the end part by a certain length of a distal end, and the inside of the distal end is of a solid structure. The distal end of the spoke at the upper end part 6 is longer than that at the lower end part 1. The outermost outline of the air distributing device with air distributing holes at the upper end part 6 is a circumference having a diameter of ϕ65 mm, such that the sleeve 4 is just enclosed on the air distributing device with air distributing holes, and the portions where the both are in contact with each other are fixed with bolts. The outermost outline of the air distributing device with air distributing holes at the lower end part 1 is a circumference having a diameter of ϕ55 mm, such that the lower end part 1 may sway with a certain magnitude within the sleeve 4.

The length of the sleeve 4 is 1.2 m, the average length of the hollow fiber membrane bundle 5 is 1.2 m, the total height of the upper end part 6 and its air distributing device 11 with air distributing holes is 70 mm, the total height of the lower end part 1 and its air distributing device 11 with air distributing holes is 50 mm, the length of the connecting pipe 10 is 1.0 m, and the total height of the upper end part 6 together with the connecting pipe 10 and the lower end part 1 is 1.12 m, such that both of the upper end part 6 and the lower end part 1 are completely covered inside the sleeve 4, while both of the top of the upper end part 6 and the bottom of the lower end part 1 have a distance of 40 mm or so from end surfaces of end openings of the sleeve. Each of the produced water pipe 8 and the air inlet pipe 9 has a length of 150 mm.

The produced water pipe 8 is connected with a water outlet branch pipe 14 over the membrane module, and the air inlet pipe 9 is connected with an aerating branch pipe 16 below the membrane module. The vertical distance between the water outlet branch pipe 14 and the aerating branch pipe 15 is 1.3 m, such that the whole membrane module may have a space of 120 mm in which it can suspendingly move upward and downward.

Figure 6:
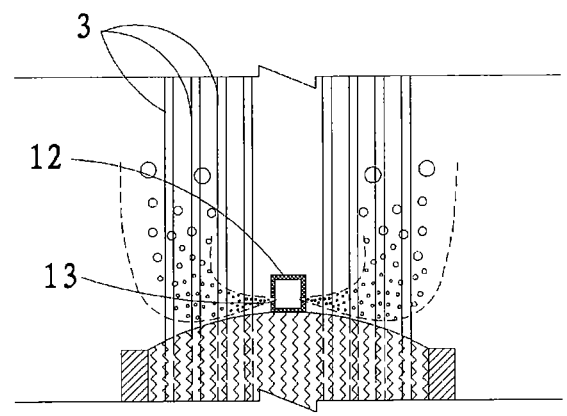
FIG. 6 is a schematic view where air flow purges the roots of the hollow fiber membrane filaments in the hollow fiber membrane module of the present invention, and is a sectional view taken at B-B in FIG. 3 without showing the sleeve.

The water outlet branch pipe 14 is communicated with a suction pipe of a water pump capable of providing negative pressure. Water to be purified enters the interior of the membrane filament through the micro-holes on the wall of the hollow fiber membrane filament 3 and converges into the produced water collecting chamber 7, then flows into the water outlet branch pipe 14 through the produced water pipe 8, and eventually is pumped out by the water pump. The aerating branch pipe 15 is communicated with an air source. Compressed air provided by the air source enters the air inlet pipe 9 through the aerating branch pipe 15, then diffuses off through the connecting pipe 10 and the air distributing holes 13 on the air distributing devices 11 with air distributing holes of the upper and lower end parts and directly purges the roots of the membrane filaments. Reference is made to FIG. 6, which is a schematic view where air flow purges the root of the hollow fiber membrane filament in the hollow fiber membrane module of the present invention and which is a sectional view at B-B in FIG. 3. It may be seen from the comparison of the purging ways of FIG. 6 and FIG. 1, occurrence of sludge accumulating phenomenon at the roots of the membrane filaments can be effectively prevented by the hollow fiber membrane module provided by the present invention.

Figure 4:
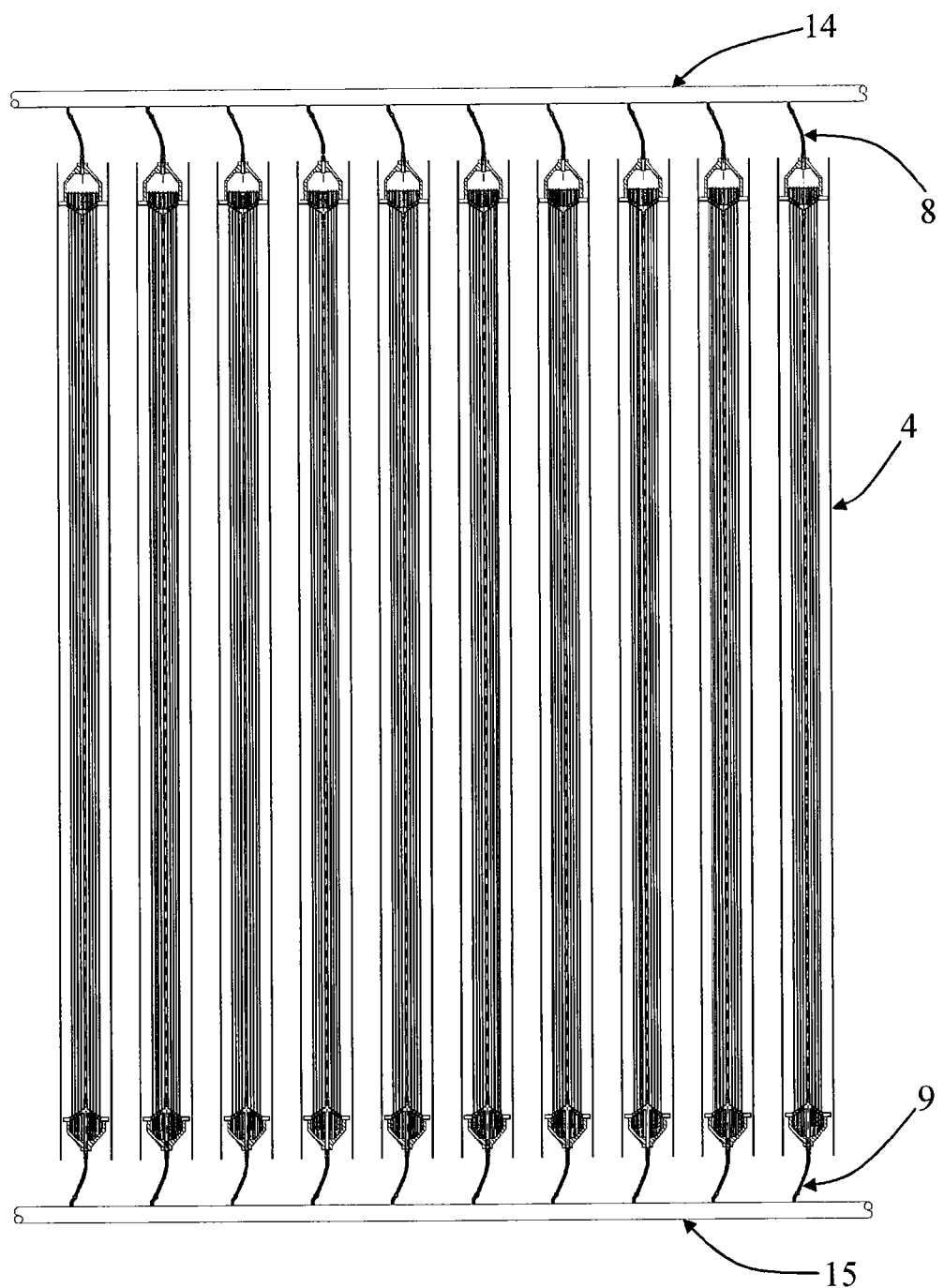
FIG. 4 is a schematic view of a membrane unit composed of a plurality of hollow fiber membrane modules of the present invention in example 1.

Several produced water pipes 8 and air inlet pipes 9 of the hollow fiber membrane modules are connected in parallel respectively to the water outlet branch pipe 14 and the aerating branch pipe 15 such that a membrane unit in a matrix form is formed (as show in FIG. 4).

Example 2

This hollow fiber membrane module has the same structure as that of example 1.

Figure 5:
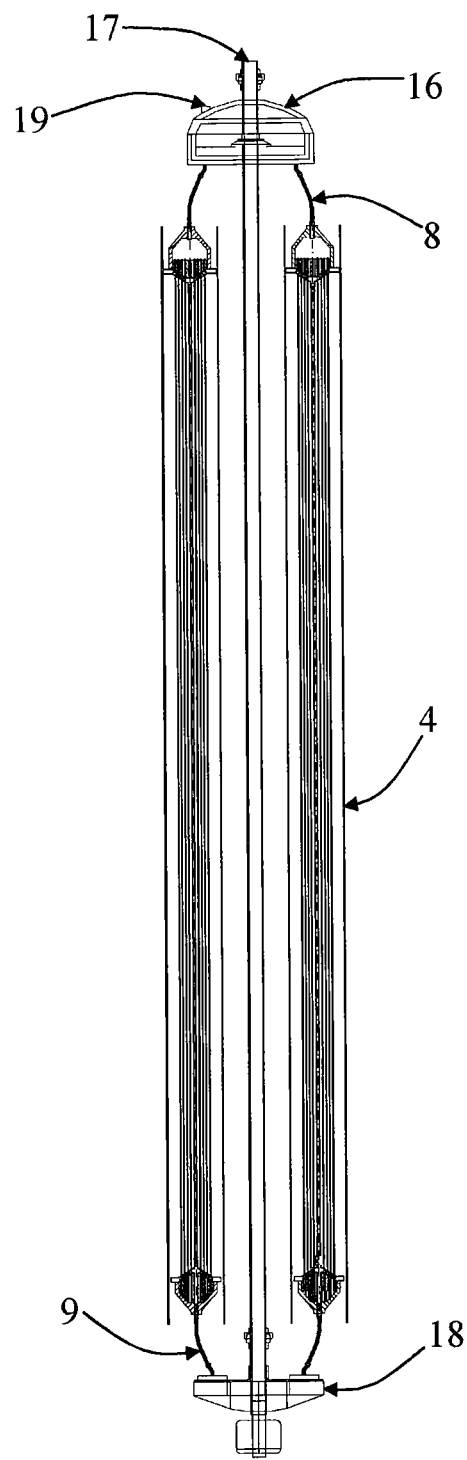
FIG. 5 is a schematic view of a membrane unit composed of a plurality of hollow fiber membrane modules of the present invention in example 2.

As shown in FIG. 5, a radial type membrane unit is constituted by eight hollow fiber membrane modules, a water collecting end part 16, a central pipe 17 and an air distributing end part 18. Produced water pipes 8 are connected with eight quick couplings uniformly distributed at a lower end surface of the water collecting end part 16 having a diameter of 150 mm. The central pipe 17 having a diameter of ϕ40 mm and a length of 1.5 mm passes through along an axis of the water collecting end part 16. The eight membrane modules are distributed uniformly around the central pipe 17, the lower portion of the central pipe 17 is connected with the air distributing end part 18 having a diameter of 150 mm. Air inlet pipes 9 of the eight membrane modules are connected with eight quick couplings distributed uniformly at an upper end surface of the air distributing end part 18. When the membrane unit is operated, the hollow fiber membrane bundle 5 is surrounded by liquid to be filtered. Compressed air provided by an air source enters from an upper opening of the central pipe 17, and then enters into the air inlet pipes 9 of the eight membrane modules through the air distributing end part 18, and eventually diffuses off through the connecting pipe 10 and the air distributing holes 13 on the air distributing device 11 with air distributing holes at the upper and lower end parts and directly purges the roots of the membrane filaments. A water outlet 19 of the water collecting end part 16 is communicated with a water pump capable of providing negative pressure. Water to be purified enters the interior of the membrane filament through the micro-holes on the wall of the hollow fiber membrane filament 3 and converges into the produced water collecting chamber 7, then flows into the water collecting end part 16 through the produced water pipe 8, and eventually is pumped out by the water pump. Reference is made to FIG. 6, which is a schematic view where air flow purges the roots of the hollow fiber membrane filaments in the hollow fiber membrane module of the present invention and which is sectional view at B-B in FIG. 3. It may be seen from the comparison of the purging ways of FIG. 6 and FIG. 1, occurrence of sludge accumulating phenomenon at the roots of the membrane filaments can be effectively prevented by the hollow fiber membrane module provided by the present invention.

Example 3

Figure 7:
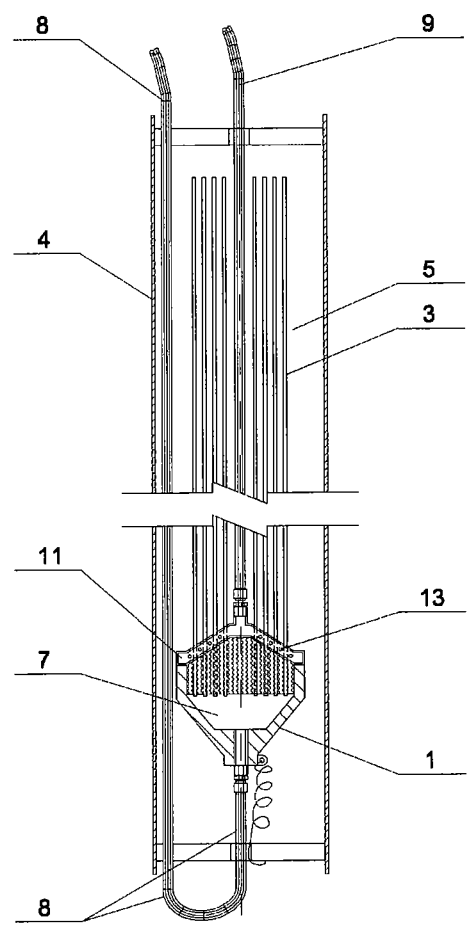
FIG. 7 is a longitudinal sectional view of the hollow fiber membrane module described in example 3.

As shown in FIG. 7, this example differs from example 1 in that the hollow fiber membrane module only has the lower end part. The configuration of other components is adjusted accordingly.

Figure 8:
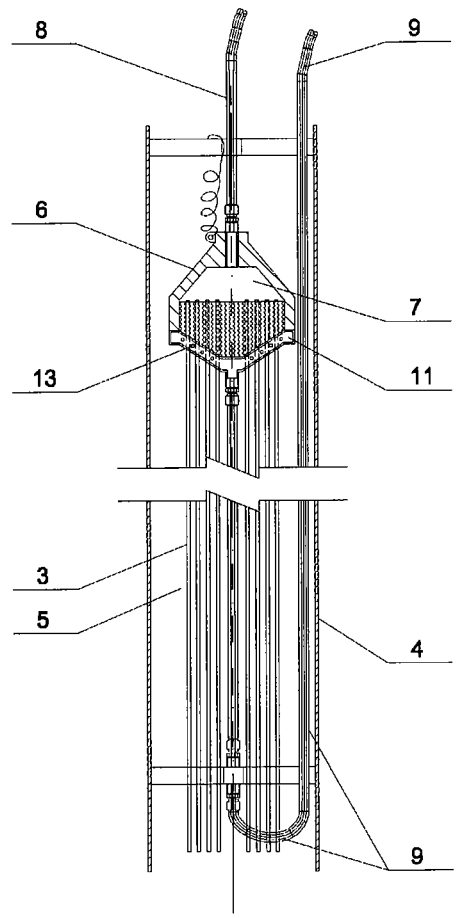
FIG. 8 is a longitudinal sectional view of another embodiment of the hollow fiber membrane module described in example 3.

With the hollow fiber membrane module of this example, if it is reversed, another embodiment will be provided, i.e., a hollow fiber membrane module having only the upper end part as shown in FIG. 8. Similarly, the corresponding components may also be properly adjusted as desired.

Example 4

Figure 9:
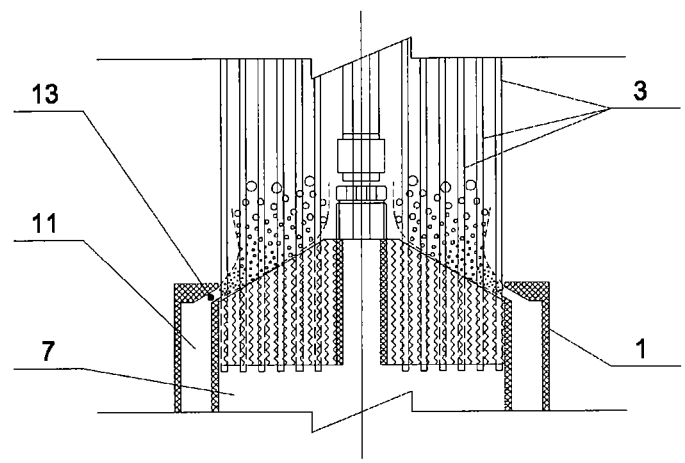
FIG. 9 is a schematic view where air flow purges the roots of the hollow fiber membrane filaments in the hollow fiber membrane module described in example 4.

As shown in FIG. 9, this example differs from example 1 in that the end surface of the end part of the hollow fiber membrane module is a protruded end surface of truncated cone shape. The air distributing holes 13 of the air distributing device 11 with air distributing holes are arranged around the circumference of the lower end part. There are totally thirty six air distributing holes distributed uniformly, and a portion of the air distributing hole that extends inwardly of the air distributing device and is in communication with the cavity thereof is a cylindrical passage. The central axis of the cylindrical passage is parallel to the slope of the adjacent side wall of the truncated cone, and the air distributing hole is opened toward the top of the truncated cone shaped protrusion.

Figure 1:
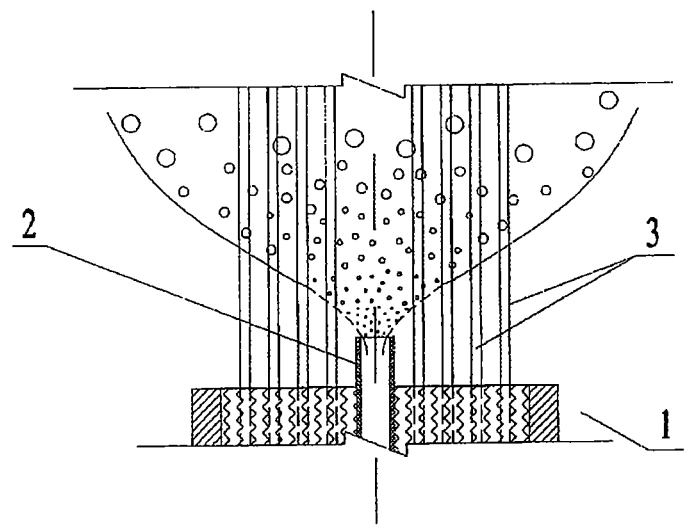
FIG. 1 is a schematic view of purging at a lower end part of a hollow fiber membrane module of the prior art.

It can be seen from the comparison of FIG. 9 with FIG. 1 and FIG. 6, with the end surface of the end part of the hollow fiber membrane module being a protruded end surface, the purging way of this example may further prevent occurrence of sludge accumulating phenomenon at the roots of the membrane filaments.

Example 5

Figure 10:
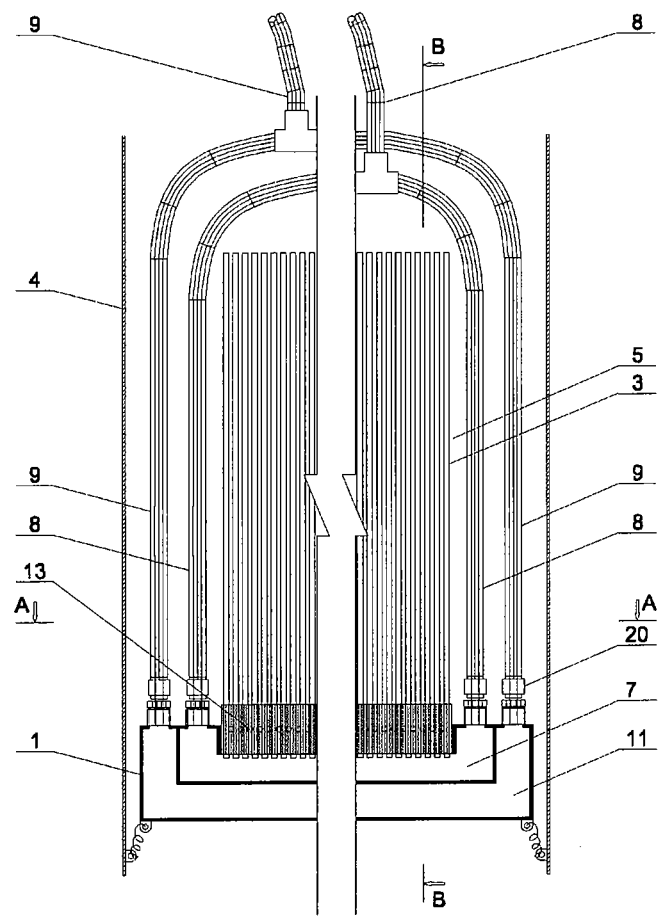
FIG. 10 is a longitudinal sectional view of a hollow fiber curtain type membrane module described in example 5.
Figure 11:
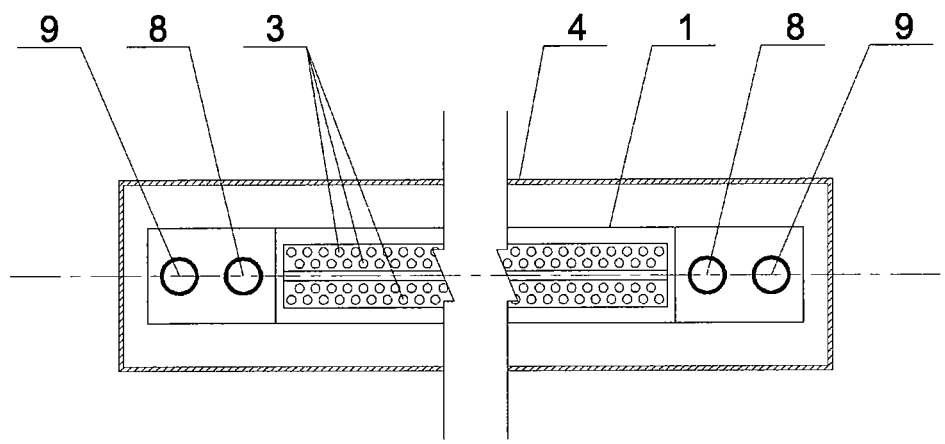
FIG. 11 is a sectional view taken at A-A in FIG. 10.
Figure 12:
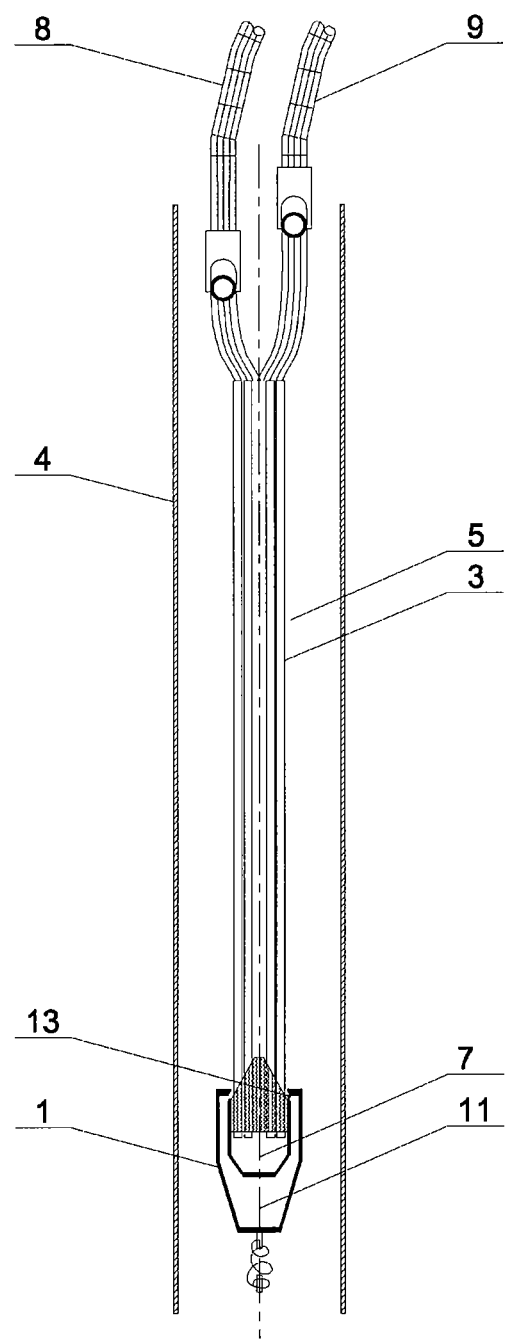
FIG. 12 is a sectional view taken at B-B in FIG. 10.

As shown in FIGS. 10, 11 and 12, a hollow fiber curtain type membrane module includes a shell which has a length of 600 mm, a width of 60 mm and is made of material of UPVC plastic. In this example, the shell may also be considered as a sleeve 4 similar to that of the first example and also function to restrain air flow. For consistence, it is also referred to as a sleeve in this example. A hollow fiber membrane bundle 5 consisted of three hundred and ninety eight hollow fiber membrane filaments 3 is disposed within the sleeve 4 and is positioned vertically. Micro-holes of the hollow fiber membrane filaments 3 for passing liquid therethrough has an average aperture of 0.4 μm, the hollow fiber membrane filament has an outer diameter of 2.8 mm and is made of material of PVDF. The upper end of the hollow fiber membrane bundle 5 may sway freely, where each the membrane filament is in a closed state and is sealed with flexible epoxy resin, and the lower ends of the membrane filaments are converged in the lower end part 1 by being cast with epoxy resin and are secondarily cast with polyurethane, so as to protect the root of the membrane filament. The lower end part 1 is of an elongated rectangular shape in its overall profile having a length of 585 mm and a width of 30 mm. The produced water collecting chamber 7 is provided inside the lower end part 1. The lower end of the hollow fiber membrane filament 3 is in an opened state in the produced water collecting chamber 7 within the lower end part 1. The produced water pipe 8 having an outer diameter of φ12 mm is extended into the inside of the sleeve 4 from the upper end opening of the sleeve 4 and is separated into two branch pipes each having an outer diameter of φ12 mm through a T-shaped tee joint. Both of the branch pipes are connected to the lower end part 1 through quick couplings 20 with inner chambers thereof being in communication with the produced water collecting chamber 7 within the lower end part 1. The air inlet pipe 9 having an outer diameter of φ12 mm is extended into the inside of the sleeve 4 from the upper end opening of the sleeve 4 and is separated into two branch pipes each having an outer diameter of φ12 mm through a T-shaped tee joint. Both of the branch pipes are connected to the lower end part 1 through quick couplings 20 with inner chambers thereof being in communication with the inner chamber of the air distributing device 11 with air distributing holes at the lower end part 1. The produced water pipe 8 and the branch pipes thereof and the air inlet pipe 9 and the branch pipes thereof are all hollow plastic hoses.

The cast end surface of the lower end part 1 is of a protruded and elongated prismoid shape, any cross section in a direction perpendicular to the lengthwise direction of the end part is of the same isosceles trapezoid shape. The length of the longer side of the bottom surface of the prismoid is 500 mm and the length of the shorter side thereof is 20 mm. The length of the longer side of the top surface of the prismoid is 500 mm and the length of the shorter side thereof is 3 mm. The height between the top surface and the bottom surface is 15 mm. The lower end part 1 has the air distributing device 11 provided outside the produced water collecting chamber 7. The produced water collecting chamber 7 is just inserted into a groove at the center of the air distributing device 11, however, the produced water collecting chamber 7 and the cavity of the air distributing device 11 are isolated from each other. The side wall of the air distributing device 11 with air distributing holes is higher than the cast end surface by 4 mm. Along the longer sides of the bottom surface of the prismoid, ninety nine circular air distributing holes 13 having a diameter of 2.88 mm are uniformly arranged at an inner side of portions of the tops of the opposing side walls higher than the cast end surface at a center position in height. The center distance between every two adjacent distributing holes 13 in the same row is 5 mm. A portion of the air distributing hole 13 that extends inwardly of the air distributing device 11 and is in communication with the cavity thereof is a cylindrical passage having a diameter of 1 mm. The central axis of the cylindrical passage is parallel to the slope of the side wall of the prismoid-shaped protrusion.

Figure 13:
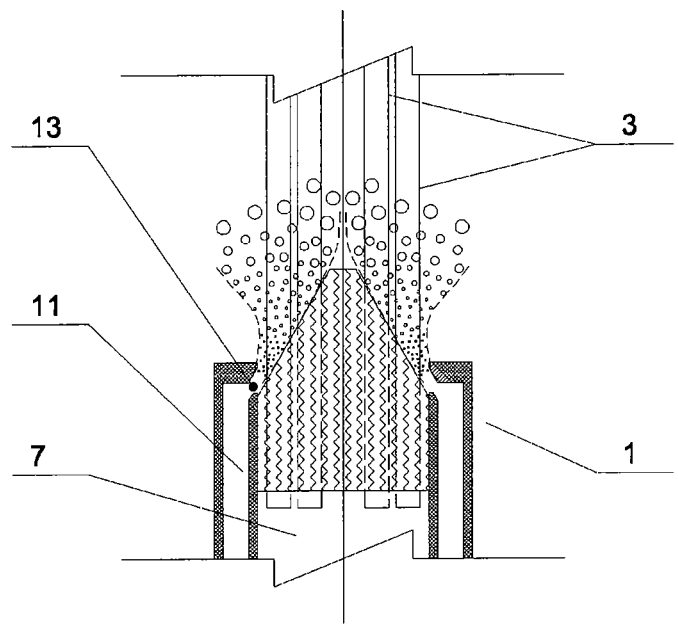
FIG. 13 is a schematic view where air flow purges the roots of the hollow fiber membrane filaments in the hollow fiber curtain type membrane module described in example 5.

Reference is made to FIG. 13, which is a schematic view where air flow purges the roots of the hollow fiber membrane filaments in the hollow fiber curtain type membrane module described in example 5. It can be seen from FIG. 13, such purging method is similar to the purging method shown in FIG. 9, but the purging ways differ due to the variance in configuration of the end parts. Meanwhile, the purging method as shown in FIG. 9 is purging all around, while in the purging method shown in FIG. 13, purging is performed by air distributing holes disposed only in the lengthwise direction. Furthermore, due to the fact that the number of the hollow fiber membrane filaments of the curtain type membrane module in the width direction is less than that of the hollow fiber membrane module described in the examples 1-4, a better purging effect is achieved and occurrence of sludge accumulating phenomenon at the roots of the membrane filaments is further prevented.

Figure 14:
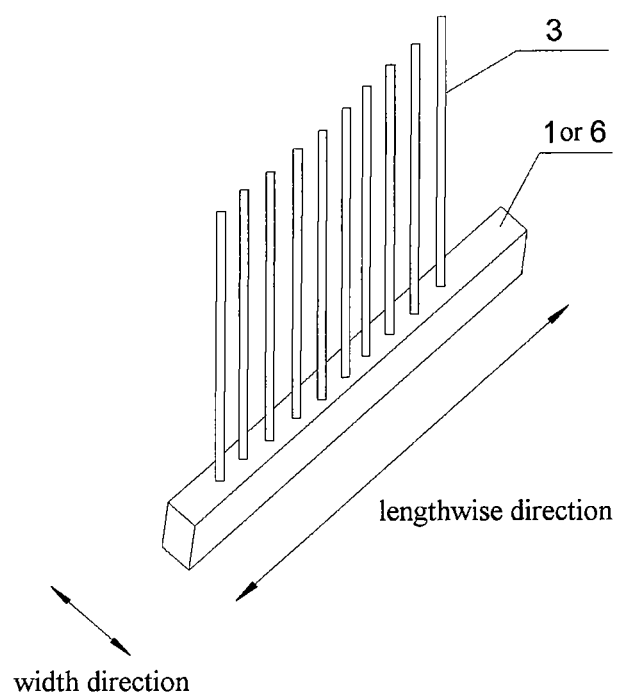
FIG. 14 is a schematic view of the end part of the hollow fiber curtain type membrane module in a lengthwise direction and a width direction.
Figure 15:
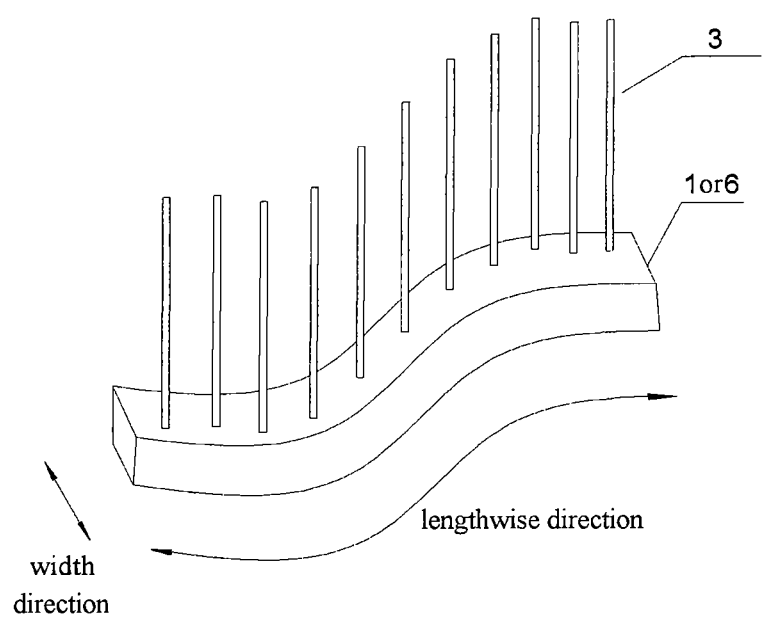
FIG. 15 is a schematic view of the end part of another hollow fiber curtain type membrane module in a lengthwise direction and a width direction.

Referring to FIGS. 14 and 15, in which the lengthwise direction and the width direction mentioned in this example are illustrated.

The height of the sleeve 4 is 1.6 m, the average length of the hollow fiber membrane bundle 5 is 1.45 m, the total length of the lower end part 1 is 50 mm, and the distance from the lower edge of the lower end part 1 to the lower end opening of the sleeve 4 is 30 mm. The vertical height of each of the portions where the produced water pipe 8 and the branch pipes thereof and the air inlet pipe 9 and the branch pipes thereof extend within the sleeve 4 is 1.52 m, and the length of each of the portions extending outside the sleeve 4 is 300 mm.

Mounted in a way as in the prior art, the membrane bioreactor or the water treatment equipment may be obtained using the hollow fiber membrane module or the hollow fiber curtain type membrane module provided by the present invention. Therefore, description of the membrane bioreactor and the water treatment equipment will not be repeated here.

The above description only involves preferred embodiments of the present invention. It should be noted that some variations and modifications can further be made by those skilled in the art without departing from the principle of the present invention. These variations and modifications should also be considered as being within the scope of protection of the present invention.

What is claimed is:

1. A hollow fiber membrane module comprising:
   a hollow fiber membrane bundle consisting of a plurality of hollow fiber membrane filaments having a first end and a second end,
   an air inlet pipe;
   a first end part coupled to the first end of the hollow fiber membrane bundle and the air inlet pipe
   wherein the first end of the hollow fiber membrane bundle is cast in the first end part to form a first cast end part of the hollow fiber membrane bundle and a first near cast end part of the hollow fiber membrane bundle that is immediately adjacent to the first cast end part; and
   a first air distributing device coupled to the air inlet pipe and affixed to the first end part proximate to the first near cast end part of the hollow fiber membrane bundle, comprising
   air distributing holes opened towards the first near cast end part of the hollow fiber membrane bundle to direct flow from the air inlet pipe onto the first near cast end part of the hollow fiber membrane bundle;
   wherein an end surface of the first end part is a protruded end surface protruding in a direction towards a middle of the length of each of the hollow fiber membrane filaments, and the protruded end surface is of a truncated cone shape or prismoid shape; and
   wherein when the hollow fiber membrane module is vertically placed, the air distributing holes are positioned at a bottom of the protruded end surface away from the middle of the length of each of the hollow fiber membrane filaments and the air distributing holes are opened towards a top of the protruded end surface, wherein the top of the protruded end surface is closer to the middle of the length of each of the hollow fiber membrane filaments than the bottom of the protruded end surface to the middle of the length of each of the hollow fiber membrane filaments.

2. The hollow fiber membrane module according to claim 1, wherein the air distributing holes are opened in a horizontal direction or in a downwardly inclined direction with respect to an axis of the hollow fiber membrane filaments.

3. The hollow fiber membrane module according to claim 1, wherein the air distributing holes are uniformly distributed around the first end part.

4. A membrane bioreactor using the membrane module according to claim 1.

5. A water treatment equipment using the membrane module according to claim 1.

6. The hollow fiber membrane module according to claim 1,
   wherein the hollow fiber membrane module is a hollow fiber curtain type membrane module and the first end part is of elongated shape.

7. The hollow fiber membrane module according to claim 6, wherein the air distributing holes are opened in a horizontal direction or in a downwardly inclined direction with respect to an axis of the hollow fiber membrane filaments.

8. A membrane bioreactor using the membrane module according to claim 6.

9. A water treatment equipment using the membrane module according to claim 6.

10. The hollow fiber membrane module of claim 1, further comprising:
    a produced water pipe; and
    a second end part coupled to the second end of the hollow fiber membrane bundle and the produced water pipe,
    wherein the second end of the hollow fiber membrane bundle is cast in the second end part to form a second cast end part of the hollow fiber membrane bundle and a second near cast end part of the hollow fiber membrane bundle that is immediately adjacent to the second cast end part; and
    a second air distributing device coupled to the air inlet pipe and affixed to the second end part proximate to the second near cast end part of the hollow fiber membrane bundle, comprising
    air distributing holes opened toward the second near cast end part of the hollow fiber membrane bundle to direct flow from the air inlet pipe onto the second near cast end part of the hollow fiber membrane bundle.

11. A hollow fiber membrane module comprising:
    a hollow fiber membrane bundle consisting of a plurality of hollow fiber membrane filaments having a first end and a second end,
    an air inlet pipe;
    a first end part coupled to the first end of the hollow fiber membrane bundle and the air inlet pipe;
    wherein the first end of the hollow fiber membrane bundle is cast in the first end part to form a first cast end part of the hollow fiber membrane bundle and a first near cast end part of the hollow fiber membrane bundle that is immediately adjacent to the first cast end part; and
    a first air distributing device coupled to the air inlet pipe and affixed to the first end part proximate to the first near cast end part of the hollow fiber membrane bundle, comprising
    air distributing holes opened towards the first near cast end part of the hollow fiber membrane bundle to direct flow from the air inlet pipe onto the first near cast end part of the hollow fiber membrane bundle;
    wherein an end surface of the first end part is a protruded end surface protruding in a direction towards a middle of the length of each of the hollow fiber membrane filaments, and the protruded end surface is of a truncated cone shape or prismoid shape, and wherein the air distributing device is capped on and fixed to the protruded end surface.

12. The hollow fiber membrane module according to claim 11, wherein the air distributing holes are opened in a horizontal direction or in a downwardly inclined direction with respect to an axis of the hollow fiber membrane filaments.

13. The hollow fiber membrane module according to claim 11, wherein the air distributing device has at least three hollow spokes, the air distributing holes being provided at the side surface of the spoke.

14. The hollow fiber membrane module according to claim 13, wherein the spokes are distributed radially and uniformly about the center of the first end part.

15. A membrane bioreactor using the membrane module according to claim 11.

16. A water treatment equipment using the membrane module according to claim 11.

17. The hollow fiber membrane module according to claim 11, wherein the hollow fiber membrane module is a hollow fiber curtain type membrane module and the first end part is of elongated shape.

18. The hollow fiber membrane module according to claim 17, wherein the air distributing holes are opened in a horizontal direction or in a downwardly inclined direction with respect to an axis of the hollow fiber membrane filaments.

19. The hollow fiber membrane module of claim 11, further comprising:
a produced water pipe; and
a second end part coupled to the second end of the hollow fiber membrane bundle and the produced water pipe,
wherein the second end of the hollow fiber membrane bundle is cast in the second end part to form a second cast end part of the hollow fiber membrane bundle and a second near cast end part of the hollow fiber membrane bundle that is immediately adjacent to the second cast end part; and
a second air distributing device coupled to the air inlet pipe and affixed to the second end part proximate to the second near cast end part of the hollow fiber membrane bundle, comprising
air distributing holes opened toward the second near cast end part of the hollow fiber membrane bundle to direct flow from the air inlet pipe onto the second near cast end part of the hollow fiber membrane bundle.

* * * * *